US008566899B2

(12) United States Patent
McCorkendale et al.

(10) Patent No.: US 8,566,899 B2
(45) Date of Patent: Oct. 22, 2013

(54) TECHNIQUES FOR SECURING A CHECKED-OUT VIRTUAL MACHINE IN A VIRTUAL DESKTOP INFRASTRUCTURE

(75) Inventors: Bruce McCorkendale, Manhattan Beach, CA (US); William E. Sobel, Jamul, CA (US); Matthew R. Barnes, Somerville, MA (US)

(73) Assignee: Symantec Corporation, Mountain View, CA (US)

( * ) Notice: Subject to any disclaimer, the term of this patent is extended or adjusted under 35 U.S.C. 154(b) by 226 days.

(21) Appl. No.: 13/049,480

(22) Filed: Mar. 16, 2011

(65) Prior Publication Data

US 2012/0240181 A1 Sep. 20, 2012

(51) Int. Cl.
*G06F 7/04* (2006.01)
*G06F 15/16* (2006.01)
*G06F 17/30* (2006.01)

(52) U.S. Cl.
USPC .......... 726/1; 726/2; 726/11; 726/12; 726/13; 726/14; 726/15; 726/22; 726/23; 726/24; 726/25; 726/26; 726/27; 709/223

(58) Field of Classification Search
USPC ........... 726/1, 2, 11–15, 22–27; 709/217–228
See application file for complete search history.

(56) References Cited

U.S. PATENT DOCUMENTS

| | | | | |
|---|---|---|---|---|
| 7,996,836 | B1 * | 8/2011 | McCorkendale et al. | 718/1 |
| 8,281,363 | B1 * | 10/2012 | Hernacki et al. | 726/2 |
| 8,332,570 | B1 * | 12/2012 | Cook et al. | 711/6 |
| 2009/0216975 | A1 * | 8/2009 | Halperin et al. | 711/162 |
| 2009/0217021 | A1 * | 8/2009 | Goodson et al. | 713/1 |
| 2010/0198906 | A1 * | 8/2010 | Radhakrishnan et al. | 709/203 |
| 2011/0184993 | A1 * | 7/2011 | Chawla et al. | 707/802 |
| 2011/0185292 | A1 * | 7/2011 | Chawla et al. | 715/760 |
| 2011/0185355 | A1 * | 7/2011 | Chawla et al. | 718/1 |
| 2011/0191341 | A1 * | 8/2011 | Meyer et al. | 707/736 |
| 2011/0321040 | A1 * | 12/2011 | Sobel et al. | 718/1 |
| 2012/0011499 | A1 * | 1/2012 | Conover et al. | 718/1 |

OTHER PUBLICATIONS

Liu et al., "Security Analysis of VLAN-based virtual desktop infrastructure," International Conference on Educational and Network Technology, pp. 301-304, Dec. 31, 2010.
International Search Report and Written Opinion mailed on Jun. 8, 2012, for International application No. PCT/US12/29105 filed Mar. 14, 2012 (7 pages).

* cited by examiner

*Primary Examiner* — Haresh N Patel
(74) *Attorney, Agent, or Firm* — Wilmer Cutler Pickering Hale and Dorr LLP (57) ABSTRACT

Techniques for securing checked-out virtual machines in a virtual desktop infrastructure (VDI) are disclosed. In one particular exemplary embodiment, the techniques may be realized as a method for securing a checked-out guest virtual machine including receiving a request for checking-out a guest virtual machine hosted by a server network element, wherein checking-out the guest virtual machine comprises transferring hosting of the guest virtual machine from the server network element to a client network element. The method for securing a checked-out guest virtual machines may also include configuring a security module for the guest virtual machine in order to secure the guest virtual machine and providing the security module to the guest virtual machine when the guest virtual machine is checked-out.

20 Claims, 5 Drawing Sheets

TECHNIQUES FOR SECURING A CHECKED-OUT VIRTUAL MACHINE IN A VIRTUAL DESKTOP INFRASTRUCTURE

FIELD OF THE DISCLOSURE

The present disclosure relates generally to virtual machines (VMs) in a virtual desktop infrastructure and, more particularly, to techniques for securing a checked-out virtual machine (VM) in a virtual desktop infrastructure (VDI).

BACKGROUND OF THE DISCLOSURE

Virtual desktop infrastructure (VDI) may involve remotely accessing desktop images running as virtual machines (VMs) in a datacenter. When virtual machines (VMs) are coupled to the virtual desktop infrastructure (VDI), a security virtual machine (SVM) may provide security services for a plurality of virtual machines (VMs). Virtual desktop infrastructure (VDI) may enable disconnected users continued access to the virtual machines (VMs) by allowing them to "check-out" a virtual machine (VM) (e.g., transferring the hosting of the virtual machines (VMs) from a datacenter to a user device). When the disconnected users check-out a virtual machine (VM), the checked-out virtual machine may lack endpoint security functionality.

In view of the foregoing, it may be understood that there may be significant problems and shortcomings associated with current techniques for securing a checked-out virtual machine (VM) in a virtual desktop infrastructure (VDI).

SUMMARY OF THE DISCLOSURE

Techniques for securing a checked-out virtual machine (VM) in a virtual desktop infrastructure (VDI) are disclosed. In one particular exemplary embodiment, the techniques may be realized as a method for securing a checked-out guest virtual machine comprising receiving a request for checking-out a guest virtual machine hosted by a server network element, wherein checking-out the guest virtual machine comprises transferring hosting of the guest virtual machine from the server network element to a client network element. The method for securing a checked-out guest virtual machine may also comprise configuring a security module for the guest virtual machine in order to secure the guest virtual machine and providing the security module to the guest virtual machine when the guest virtual machine is checked-out.

In accordance with other aspects of this particular exemplary embodiment, the method may further comprise transmitting a probe packet to the client network element to gather information associated with the client network element.

In accordance with further aspects of this particular exemplary embodiment, the security module for the guest virtual machine may be configured based at least in part on the information associated with the client network element.

In accordance with additional aspects of this particular exemplary embodiment, the information associated with the client network element may comprise at least one of virtualization platform, hypervisor, security information, vulnerability, rights, storage, CPU utilization, memory, and network Input/Output (I/O).

In accordance with yet another aspect of this particular exemplary embodiment, the security information associated with the client network element may comprise at least one of security application, manufacturer, version, date, history, antivirus, antispam, antimalware, and interface.

In accordance with other aspects of this particular exemplary embodiment, the method may further comprise determining whether a security application is associated with the client network element.

In accordance with further aspects of this particular exemplary embodiment, the step of configuring the security module for the guest virtual machine may comprise configuring an interface for the security module to interact with the client network element.

In accordance with additional aspects of this particular exemplary embodiment, the interface for the security module may be configured to interact with a security application associated with the client network element.

In accordance with yet another aspect of this particular exemplary embodiment, the step of configuring the security module for the guest virtual machine may comprise configuring an interface for the security module to interact with the server network element.

In accordance with other aspects of this particular exemplary embodiment, the step of configuring the security module for the guest virtual machine may comprise configuring a full version of at least one of antivirus software, antimalware software, firewall software, intrusion prevention software, and data leakage prevention software for the security module.

In accordance with further aspects of this particular exemplary embodiment, the step of configuring the security module for the guest virtual machine may comprise configuring a partial version of at least one of antivirus software, antimalware software, firewall software, intrusion prevention software, and data leakage prevention software for the security module.

In accordance with additional aspects of this particular exemplary embodiment, the step of configuring the security module for the guest virtual machine may comprise configuring an updated version of at least one of antivirus software, antimalware software, firewall software, intrusion prevention software, and data leakage prevention software for the security module.

In accordance with yet another aspect of this particular exemplary embodiment, the method may further comprise determining rights associated with the client network element based at least in part on the information associated with the client network element.

In accordance with other aspects of this particular exemplary embodiment, the method may further comprise displaying a check-out error message based at least in part on the determination that the client network element does not have rights.

In accordance with further aspects of this particular exemplary embodiment, at least one non-transitory processor readable storage medium for storing a computer program of instructions configured to be readable by at least one processor for instructing the at least one processor to execute a computer process for performing the method for securing a checked-out guest virtual machine as previously recited.

In another particular exemplary embodiment, the techniques may be realized as a system for securing a checked-out guest virtual machine comprising one or more processors communicatively coupled to a network; wherein the one or more processors may be configured to receive a request for checking-out a guest virtual machine hosted by a server network element, wherein checking-out the guest virtual machine comprises transferring hosting of the guest virtual machine from the server network element to a client network element. The one or more processor may be also configured to configure a security module for the guest virtual machine in order to secure the guest virtual machine and providing the security module to the guest virtual machine when the guest virtual machine is checked-out.

In accordance with other aspects of this particular exemplary embodiment, the one or more processors may be further configured to transmit a probe packet to the client network element to gather information associated with the client network element.

In accordance with further aspects of this particular exemplary embodiment, the security module may be configured based at least in part on the information associated with the client network element.

In accordance with additional aspects of this particular exemplary embodiment, the one or more processors may be further configured to determine whether a security application is associated with the client network element.

In accordance with further aspects of this particular exemplary embodiment, the one or more processors may be further configured to determining rights associated with the client network element based at least in part on the information associated with the client network element.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
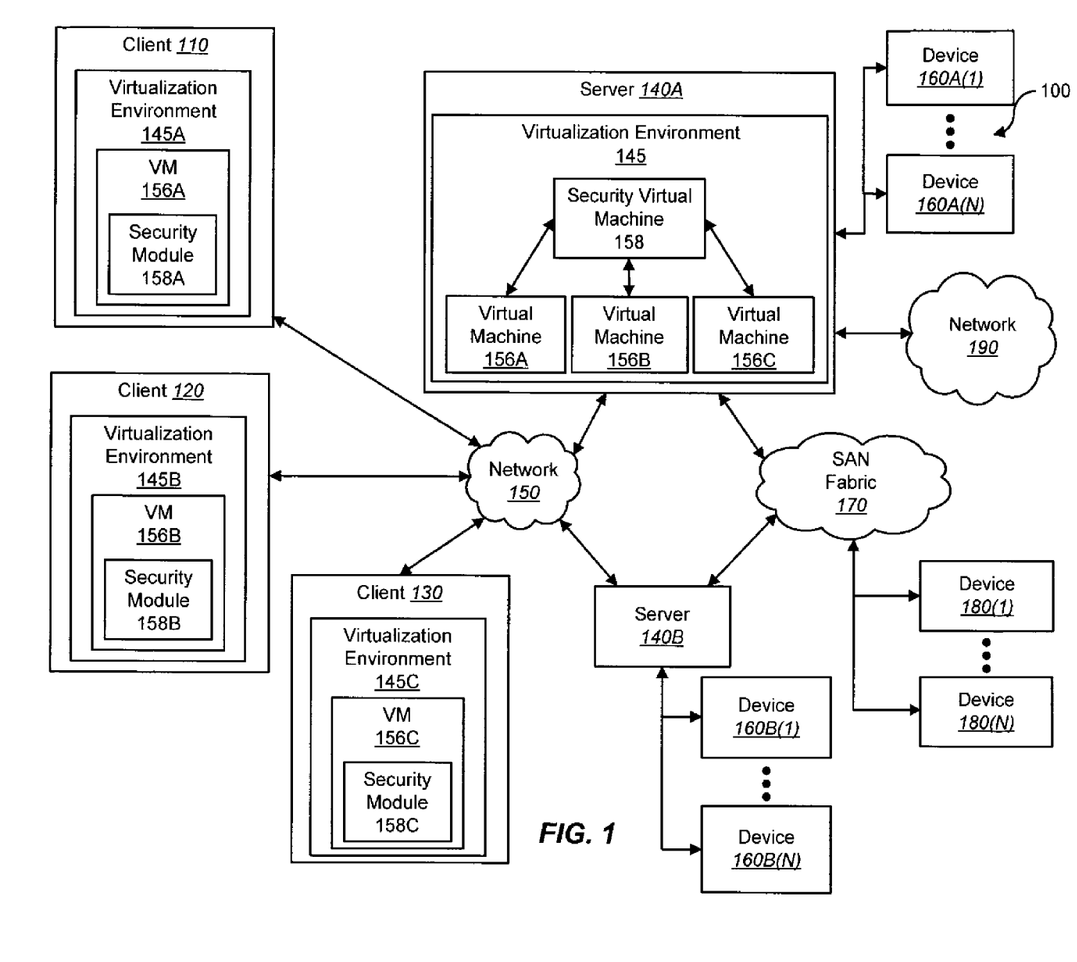
FIG. 1 shows a block diagram depicting a network architecture 100 for securing a checked-out virtual machine (VM) in a virtual desktop infrastructure (VDI) in accordance with an embodiment of the present disclosure.

FIG. 1 shows a block diagram depicting a network architecture 100 for securing a checked-out virtual machine (VM) in a virtual desktop infrastructure (VDI) in accordance with an embodiment of the present disclosure. FIG. 1 is a simplified view of network architecture 100, which may include additional elements that are not depicted. Network architecture 100 may contain client network elements 110-130 and server network elements 140A and 140B (one or more of which may be implemented using computer system 200 shown in FIG. 2). Client network elements 110-130 may be communicatively coupled to a network 150. Server network element 140A may be communicatively coupled to networks 190 and 150. Server network element 140B may be communicatively coupled to storage devices 160A(1)-(N). Server network element 140B may be communicatively coupled to a SAN (Storage Area Network) fabric 170. SAN fabric 170 may support access to storage devices 180(1)-(N) by server network element 140B, and by network element 110 via network 150.

The description below describes network elements, computers, and/or components of a system and method for securing a checked-out virtual machine in a virtual desktop infrastructure (VDI) that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Server network elements 140A and 140B may be communicatively coupled to a SAN (Storage Area Network) fabric 170. SAN fabric 170 may support access to storage devices 180(1)-(N) by server network elements 140A and 140B, and by client network elements 110-130 via network 150. Server network element 140A may be communicatively coupled to network 190. According to some embodiments, server network element 140A may be a proxy server, a datacenter, and/or other network device capable of hosting one or more virtual machines (VMs). Server network element 140A may be communicatively coupled to network 190.

Server network element 140A may comprise a platform for hosting a virtualization environment 145. For example, the server network element 140A may comprise a virtual desktop infrastructure (VDI) platform for hosting a virtualization environment via a remote desktop protocol (RDP). Virtualization environment 145 may be capable of hosting one or more virtual machines such as, for example, guest virtual machines 156A-C and a security virtual machine 158. For example, the security virtual machine 158 may provide security services to the plurality of guest virtual machines 156A-C. It may be appreciated by one of skilled in the art that a plurality of security virtual machines 158 may be implemented in order to provide security services to a plurality of guest virtual machines 156.

The client network elements 110-130 may be communicatively coupled to the server network element 140A and remotely access (e.g., via remote desktop protocol (RDP)) the guest virtual machines 156A-C via the network 150. For example, the client network element 110 may remotely access the guest virtual machine 156A, the client network element 120 may remotely access the guest virtual machine 156B, and the client network element 130 may remotely access the guest virtual machine 156C. The server network element 140A may transfer the hosting of the guest virtual machines 156A-C to the client network elements 110-130 and thus enabling the guest virtual machines 156A-C to continue operating even after the client network elements 110-130 are communicatively decoupled (e.g., "checked-out") from the server network element 140A.

In order for the guest virtual machines 156A-C to continue operating after the client network elements 110-130 are communicatively decoupled from the server network element 140A, each of the client network elements 110-130 may comprise a platform for hosting a virtualization environment 145A-C, respectively. Each virtualization environment 145A-C may be capable of supporting one or more checked-out guest virtual machines such as, for example, guest virtual machines 156A-C. According to some embodiments, virtualization environment 145A-C may be a hypervisor or a Virtual Machine Manager (VMM) hosted by the client network elements 110-130.

Virtualization may occur at different levels of abstraction. According to some embodiments, guest virtual machines 156A-C may abstract at a hardware level and may sit on top of an operating system (e.g., VMware workstation and Microsoft Virtual PC/Server). According to other embodiments, guest virtual machines 156A-C may abstract at a hardware level and may not be on top of an operating system (i.e., they may be bare-metal implementations). Guest virtual machines 156A-C may also, according to some embodiments, abstract at other levels including, but not limited to, Operating System (OS) level, OS system call level, instruction set emulation, application-binary interface emulation, user-level OS emulation, etc.

Each of the guest virtual machines 156A-C hosted by each client network elements 110-130 after communicatively decoupled from the server network element 140A may contain one of the security modules 158A-C, respectively. For example, the security modules 158A-C may be activated to provide security services to the guest virtual machines 156A-C, when the hosting of the guest virtual machines 156A-C is transferred from the server network element 140A to the client network elements 110-130. According to some embodiments, security modules 158A-C may be capable of providing security services for the guest virtual machines 156A-C when the guest virtual machines 156A-C are hosted by the virtualization environments 145A-C at the client network elements 110-130. For example, the security modules 158A-C included in the guest virtual machines 156A-C may be similar to the security virtual machine 158 located at the server network element 140A. In another example, security modules 158A-C may comprise an application programming interface (API) or interface to security programs pre-installed on the client network elements 110-130 in order to provide security services for the guest virtual machines 156A-C. In other examples, security modules 158A-C may comprises software, codes, or scripts that prevent, detect, and/or remove computer viruses, worms, intrusion, data leakage, and/or malwares in order to provide security services for the guest virtual machines 156A-C. According to some embodiments, security modules 158A-158C may not be used (e.g., security services of the guest virtual machines 156A-C may be provided by using the security virtual machine 158 of server network element 140A) when the client network elements 110-130 reestablish communication with the server network element 140A. As discussed in greater detail below security modules 158A-C may provide security services for the guest virtual machines 156A-C hosted by the client network elements 110-130, when the client network elements 110-130 are communicatively decoupled from the server network element 140A (e.g., "checked-out" virtual machines).

Figure 2:
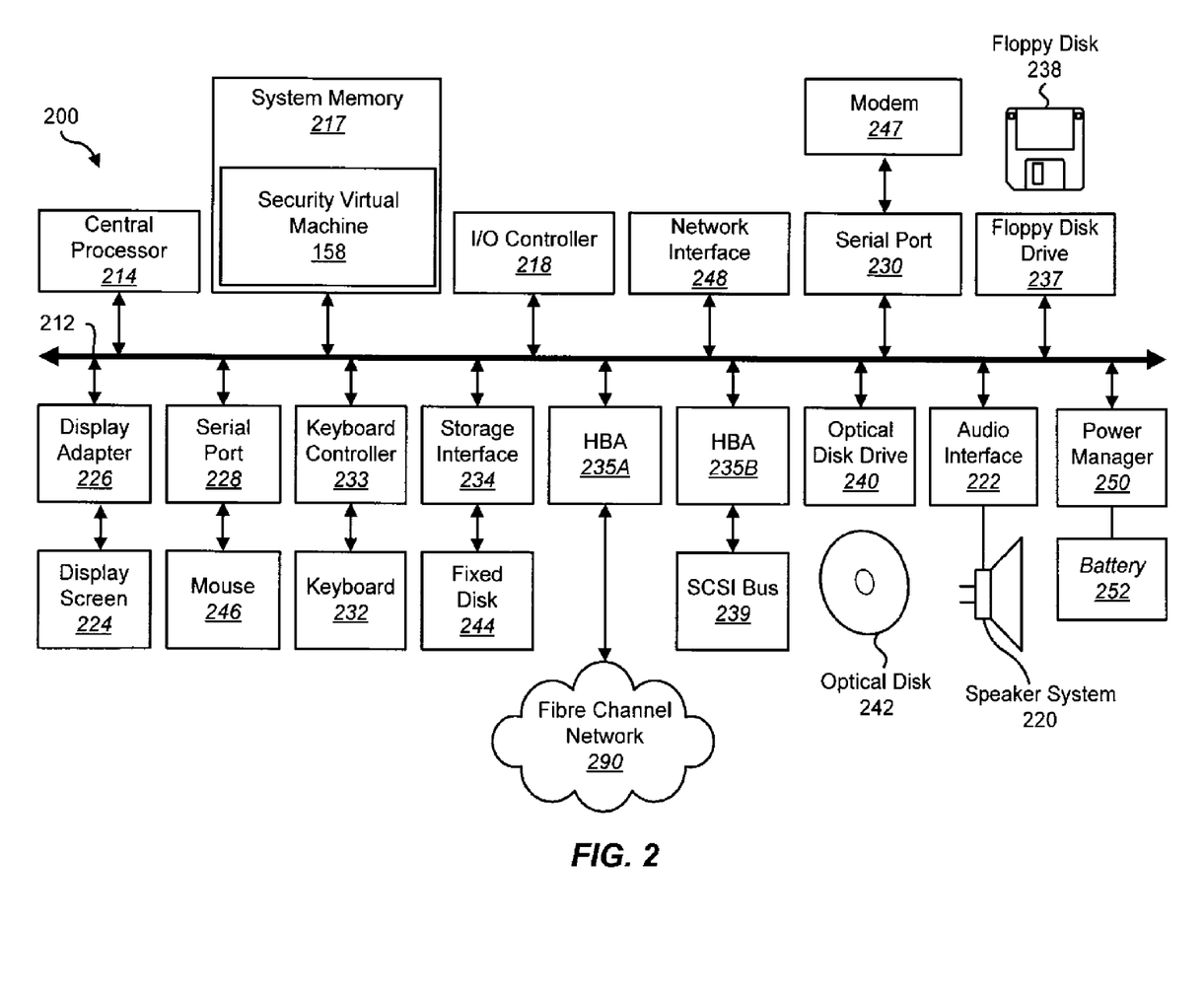
FIG. 2 depicts a block diagram of a computer system in accordance with an embodiment of the present disclosure.

With reference to computer system 200 of FIG. 2, modem 247, network interface 248, or some other method may be used to provide connectivity from of client network elements 110-130 to network 150. Client network elements 110-130 may be able to access information on server network elements 140A or 140B using, for example, a web browser or other client software. Such a client may allow client network elements 110-130 to access data hosted by server network elements 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client network elements 110-130, server network elements 140A and 140B, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more client network elements 110-130 or server network elements 140A and 140B to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server network elements 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client network elements 110-130 may be a smartphone, PDA, desktop computer, a laptop computer, a server, another computer, or another device coupled via a wireless or wired connection to network 150. Client network elements 110-130 may receive data from user input, a database, a file, a web service, and/or an application programming interface. According to some embodiments, client network elements 110-130 may be a mobile client such as, for example, a smart phone. Virtualization and transitions between virtual environments may occur on a server side platform and client network elements 110-130 may receive data for a display according to a current virtual environment.

Server network elements 140A and 140B may be application servers, archival platforms, virtualization environment platforms, backup servers, network storage devices, media servers, email servers, document management platforms, enterprise search servers, or other devices communicatively coupled to network 150. Server network elements 140A and 140B may utilize one of storage devices 160A(1)-(N), 160B(1)-(N), and/or 180(1)-(N) for the storage of application data, backup data, or other data. Server network elements 140A and 140B may be hosts, such as an application server, which may process data traveling between client network elements 110-130 and a backup platform, a backup process, and/or storage. According to some embodiments, server network elements 140A and 140B may be platforms used for backing up and/or archiving data.

According to some embodiments, security virtual machine 158 may provide security services to the guest virtual machines 156A-C when the client network elements 110-130 are communicatively coupled to the server network element 140A. The security virtual machine 158 may provide security modules 158A-C to the guest virtual machines 158A-C to be hosted by client network elements 110-130 (e.g., "checked-out") after the client network elements 110-130 are communicatively decoupled from the server network element 140A. For example, the security virtual machine 158 may provide the same security modules 158A-C to each of the guest virtual machines 158A-C. The security virtual machine 158 may configure the security modules 158A-C to have similar functionality as the security virtual machine 158 in order to provide security services to the guest virtual machines 156A-C when checked-out to the client network elements 110-130 (e.g., hosted by the client network elements 110-130).

The security virtual machine 158 may provide different security modules 158A-C to different guest virtual machines 156A-C based at least in part on a parameters associated with a hosting client network elements 110-130. For example, the security virtual machine 158 may probe the client network elements 110-130 in order to determine one or more parameters associated with the client network elements 110-130. One or more parameters associated with the client network elements 110-130 may comprise virtualization platform, hypervisor, security, vulnerability, rights, storage, CPU utilization, memory, network Input/Output (I/O) and other parameters associated with the client network elements 110-130. The security virtual machine 158 may provide the configured security modules 158A-C to the guest virtual machines 156A-C that may be hosted by the client network elements 110-130 after the client network elements 110-130 are communicatively decoupled from the server network element 140A.

In an exemplary embodiment, the security modules 158A-C may include an application programming interface (API) or other interfaces to interact with the security virtual machine 158. The security virtual machine 158 may communicate with the security modules 158A-C via the interface. For example, the security virtual machine 158 may communicate one or more instructions to the security modules 158A-C. The security virtual machine 158 may communicate an activation instruction to the security modules 158A-C. The security virtual machine 158 may communicate a deactivation instruction to the security modules 158A-C. The security virtual machine 158 may communicate an uninstall instruction to the security modules 158A-C. The security virtual machine 158 may provide one or more updates to the security modules 158A-C via the interface. For example, the security virtual machine 158 may provide an updated antivirus software, antimalware software, firewall software, intrusion prevention software, data leakage prevention software, and/or other security software to the security modules 158A-C. The security virtual machine 158 may periodically update the security modules 158A-C. For example, the security virtual machine 158 may update the security modules 158A-C, when the client network elements 110-130 are communicatively coupled to the server network element 140A.

The interface of the security modules 158A-C may interact with security programs pre-installed on the client network elements 110-130. For example, the interface of the security modules 158A-C may communicate with the security program pre-installed on the client network elements 110-130. For example, the security modules 158A-C may communicate one or more instructions to the security application pre-installed on the client network elements 110-130. The security modules 158A-C may communicate an activation instruction to the security application pre-installed on the client network elements 110-130. The security module 158A-C may activate the security application pre-installed on the client network elements 110-130 in order to provide security services for the guest virtual machines 156A-C. The security modules 158A-C may communicate a deactivation instruction to the security applications pre-installed on the client network elements 110-130.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, security virtual machine 158 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
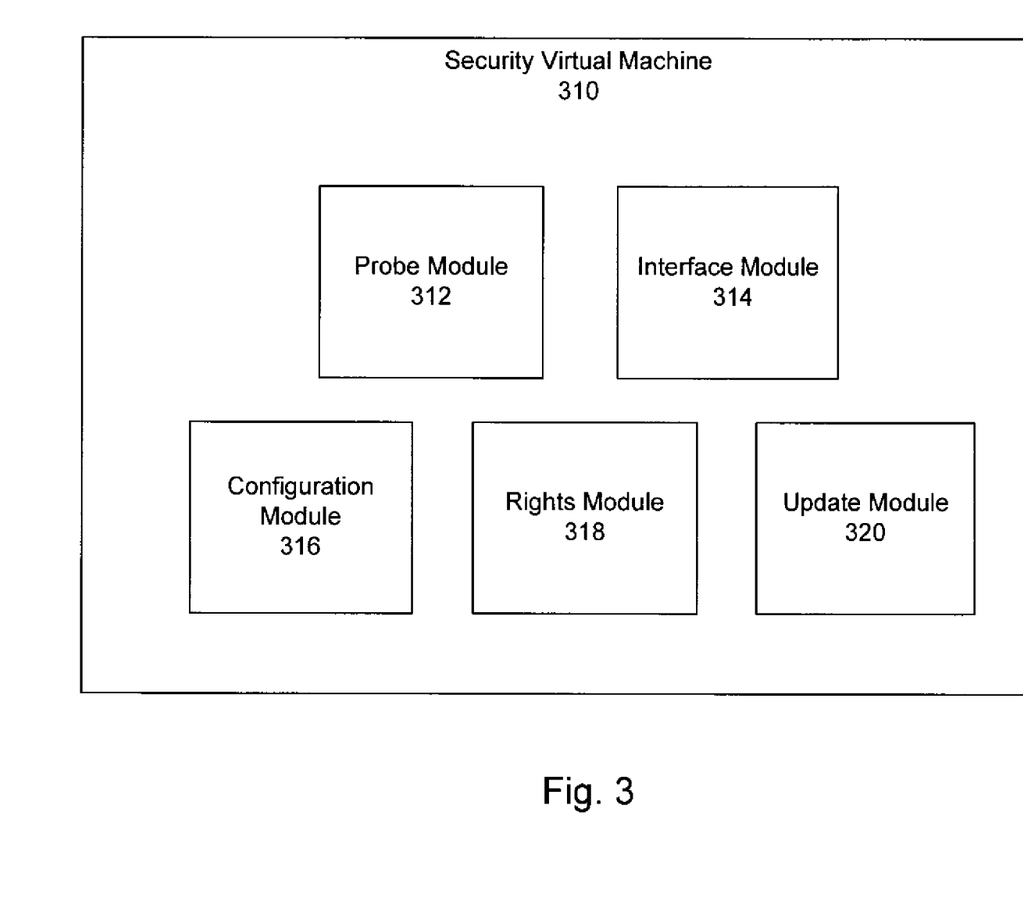
FIG. 3 shows a security virtual machine in accordance with an embodiment of the present disclosure.

Referring to FIG. 3, there is shown a security virtual machine 310 in accordance with an embodiment of the present disclosure. As illustrated, the security virtual machine 310 may contain one or more components including a probe module 312, an interface module 314, a configuration module 316, and/or an update module 320.

The probe module 312 may probe the client network elements 110-130 to capture information and/or parameters associated with the client network elements 110-130. For example, the probe module 312 may transmit a probe packet to the client network elements 110-130. The probe packet may capture information and/or parameters associated with the client network elements 110-130. The probe packet with captured information and/or parameters may be returned to the probe module 312. The probe module 312 may extract information and/or parameters associated with the client network elements 110-130. For example, the information and/or parameters associated with the client network elements 110-130 may include virtualization platform, hypervisor, security information, vulnerability, rights, storage, CPU utilization, memory, network Input/Output (I/O) and other parameters associated with the client network elements 110-130.

In an exemplary embodiment, the security information associated with the client network elements 110-130 may include information associated with the security application pre-installed on the client network elements 110-130. The information associated with the security application pre-installed on the client network elements 110-130 may include security application, manufacturer, version, date, history, antivirus, antispam, antimalware, interface, and/or other characteristics associated with the security application. In another exemplary embodiment, the security information associated with the client network elements 110-130 may indicate that no security application may be pre-installed on the client network elements 110-130. The security information associated with the client network elements 110-130 may include information associated with the security modules 158A-C associated with guest virtual machines 156A-C. The probe module 312 may provide the information and/or parameters associated with the client network elements 110-130 to various modules (e.g., interface module 314, configuration module 316, rights module 318, and/or update module 320) of the security virtual machine 310.

The interface module 314 may interact with the security modules 158A-C of the guest virtual machines 156A-C hosted by the client network elements 110-130. For example, the interface module 314 may communicate one or more instructions to the security modules 158A-C. The interface module 314 may communicate an activation instruction to the security modules 158A-C. The interface module 314 may communicate a deactivation instruction to the security modules 158A-C. The interface module 314 may communicate an uninstall instruction to the security modules 158A-C. The interface module 314 may provide one or more updates to the security modules 158A-C.

The configuration module 316 may comprise one or more processors to configure the security modules 158A-C. The security modules 158A-C may be provided to the guest virtual machines 156A-C, when the guest virtual machines 156A-C are checked-out to the client network elements 110-130 (e.g., hosted by the client network elements 110-130 when the client network elements 110-130 are communicatively decoupled from the server network elements 140A). The configuration module 316 may receive information from other modules of the security virtual machine 310 in order to configure the security modules 158A-C of the guest virtual machines 156A-C.

The configuration module 316 may receive information and/or parameters associated with the client network elements 110-130 that are going to host the guest virtual machines 156A-C. The configuration module 316 may configure the security modules 158A-C based at least in part on the information and/or parameters associated with client network elements 110-130 that are going to host the guest virtual machines 156A-C. In an exemplary embodiment, the configuration module 316 may configure the security modules 158A-C to include an interface with the security application pre-installed on the client network elements 110-130. The interface of the security module 158A-C may interact with the security application pre-installed on the client network elements 110-130. For example, the interface of the security module 158A-C may interact with the security application pre-installed on the client network elements 110-130 in order to provide security services for the guest virtual machines 156A-C.

For example, the configuration module 316 may determine that the client network elements 110-130 may have an obsolete security application installed or may not have a security application pre-installed based at least in part on the information and/or parameters associated with the client network elements 110-130. The configuration module 316 may configure the security modules 158A-C to include antivirus software, antimalware software, firewall software, intrusion prevention software, data leakage prevention software, and/or other security software in order to provide security services to the guest virtual machines 156A-C that are checked-out to the client network elements 110-130 (e.g., hosted by the client network elements 110-130 when the client network elements 110-130 are communicatively decoupled from the server network element 140A). In an exemplary embodiment, when the client network elements 110-130 may not have a security application installed, the configuration module 316 may configure the security modules 158A-C to include a full version of the antivirus software, the antimalware software, firewall software, intrusion prevention software, data leakage prevention software, and/or other security software in order to provide security services to the guest virtual machines 156A-C. In another exemplary embodiment, when the client network elements 110-130 may have an obsolete security application pre-installed, the configuration module 316 may configure the security modules 158A-C to include a partial version of the antivirus software the antimalware software, firewall software, intrusion prevention software, data leakage prevention software, and/or other security software to operate in conjunction with the obsolete security application pre-installed on the client network elements 110-130. In other exemplary embodiments, the configuration module 316 may configure the security module 158A-C to have the same antivirus software, antimalware software, firewall software, intrusion prevention software, data leakage prevention software, and/or other security software for all the client network elements 110-130.

The rights module 318 may determine rights associated with the client network elements 110-130. The rights module 318 may determine rights associated with the client network elements 110-130 based at least in part on the information and/or parameters associated with the client network elements 110-130. For example, the rights module 318 may determine whether the client network elements 110-130 have rights to check-out the guest virtual machines 156A-C. The rights module 318 may also determine whether the client network elements 110-130 have rights to receive antivirus software, antimalware software, firewall software, intrusion prevention software, data leakage prevention software, and/or other security software of the security modules 158A-C. The rights module 318 may determine whether the client network elements 110-130 have rights to receive a full version or a partial version of the antivirus software, the antimalware software, firewall software, intrusion prevention software, data leakage prevention software, and/or other security software. The rights module 318 may determine whether the client network elements 110-130 have rights to receive updates of the security modules 158A-C.

The update module 320 may update the security modules 158A-C of the guest virtual machines 156A-C hosted by the client network elements 110-130. For example, the update module 320 may provide an updated antivirus software, antimalware software, firewall software, intrusion prevention software, data leakage prevention software, and/or other security software to the security modules 158A-C via the interface module 314. The update module 320 may periodically update the security modules 158A-C of the guest virtual machines 156A-C hosted by the client network elements 110-130. For example, the update module 320 may update the security modules 158A-C, whenever the guest virtual networks 156A-C hosted by the client network elements 110-130 are communicatively coupled to the server network element 140A.

Figure 4:
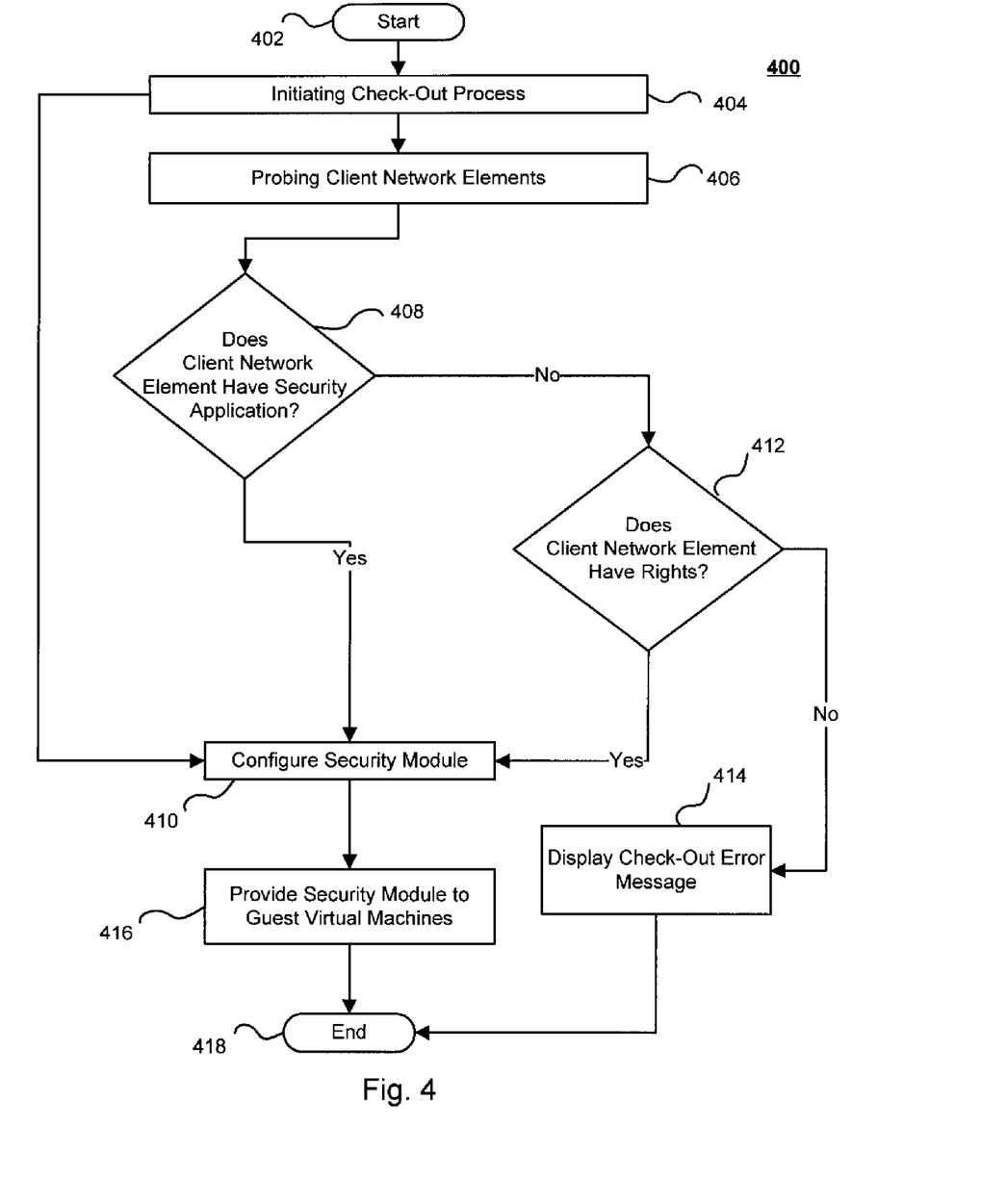
FIG. 4 depicts a method for providing security to a checked-out virtual machine in a virtual desktop infrastructure (VDI) in accordance with an embodiment of the present disclosure.

Referring to FIG. 4, there is depicted a method 400 for providing security to a checked-out virtual machine in a virtual desktop infrastructure (VDI) in accordance with an embodiment of the present disclosure. At block 402, the method 400 may begin.

At block 404, a user associated with one or more client network elements 110-130 may initiate a check-out process. For example, one or more client network elements 110-130 may be communicatively coupled to the server network element 140A via the network 150. A user associated with one or more client network elements 110-130 may remotely access (e.g., via remote desktop protocol (RDP)) one or more guest virtual machines 156A-C hosted by the server network element 140A. The user may decide to communicatively decouple the client network elements 110-130 from the server network element 140A, but may still wish to continue access the guest virtual machines 156A-C. The user may initiate the check-out process in order to transfer the hosting of the guest virtual machines 156A-C from the server network element 140A to the client network elements 110-130 (e.g., the guest virtual machines 156A-C to be hosted by the client network elements 110-130). The user may send a request to initiate the check-out process in order to continue access the guest virtual machines 156A-C, when the client network elements 110-130 are communicatively decoupled from the server network element 140A.

At block 410, the configuration module 316 may configure the security modules 158A-C for the guest virtual machines 156A-C. The configuration module 316 may configure the security modules 158A-C to include antivirus software, antimalware software, firewall software, intrusion prevention software, data leakage prevention software, and/or other security software in order to provide security services to the guest virtual machines 156A-C that will be hosted by the client network elements 110-130. In an exemplary embodiment, the configuration module 316 may configure the security modules 158A-C to include an interface to communicate with the guest virtual machines 156A-C to be hosted on the client network elements 110-130. The interface of the security module 158A-C may directly communicate with the guest virtual machines 156A-C in order to provide security services to the guest virtual machines 156A-C.

At block 406, the security virtual machine 310 may probe the client network elements 110-130 to receive information and/or parameters associated with the client network elements 110-130. For example, the probe module 312 of the security virtual machine 310 may transmit a probe packet to the client network elements 110-130 to capture information and/or parameters associated with the client network elements 110-130. In an exemplary embodiment, the information and/or parameters associated with the client network elements 110-130 may include virtualization platform, hypervisor, security information, vulnerability, rights, storage, CPU utilization, memory, network Input/Output (I/O), and other parameters associated with the client network elements 110-130. The probe module 312 may extract the information and/or parameters associated with the client network elements 110-130 from the probe packet. The probe module 312 may provide the information and/or parameters associated with the client network elements 110-130 to other modules of the security virtual machine 310.

At block 408, it may be determined whether a security application is pre-installed on the client network elements 110-130. For example, the configuration module 316 of the security virtual machine 310 may determine whether a security application is pre-installed on the client network elements 110-130. The configuration module 316 may determine whether a security application is pre-installed on the client network elements 110-130 based at least in part on the information and/or parameters associated with the client network elements 110-130.

In an alternative embodiment, at block 410, the configuration module 316 may determine that a security application is pre-installed on the client network elements 110-130, and the configuration module 316 may configure the security modules 158A-C. The configuration module 316 may configure the security modules 158A-C based at least in part on the security information associated with the client network elements 110-130. In an exemplary embodiment, the configuration module 316 may configure the security modules 158A-C to include an interface with the security application pre-installed on the client network elements 110-130. The interface of the security module 158A-C may interact with the security application pre-installed on the client network elements 110-

130. For example, the interface of the security modules 158A-C may interact with the security application pre-installed on the client network elements 110-130 in order to provide security services for the guest virtual machines 156A-C.

In another exemplary embodiment, the configuration module 316 may determine that the client network elements 110-130 may have an obsolete security application installed on the client network elements 110-130. The configuration module 316 may configure the security modules 158A-C to interact with the obsolete security application pre-installed on the client network elements 110-130. In another exemplary embodiment, the configuration module 316 may configure the security modules 158A-C to include an updated antivirus software, antimalware software, firewall software, intrusion prevention software, data leakage prevention software, and/or other security software in order to provide security services to the guest virtual machines 156A-C that will be hosted by the client network elements 110-130. In other exemplary embodiments, the configuration module 316 may configure the security modules 158A-C to include an antivirus software an antimalware software, firewall software, intrusion prevention software, data leakage prevention software, and/or other security software regardless of the security application pre-installed on the client network elements 110-130.

At block 412, the configuration module 316 may determine that a security application is not pre-installed on the client network elements 110-130, and the rights module 318 may determine whether the client network elements 110-130 have rights to receive security modules 158A-C. For example, the rights module 318 may verify whether the client network elements 110-130 have rights to receive antivirus software antimalware software, firewall software, intrusion prevention software, data leakage prevention software, and/or other security software of the security modules 158A-C. Also, the rights module 318 may issue rights to allow the client network elements 110-130 to receive the security modules 158A-C comprising antivirus software, antimalware software, firewall software, intrusion prevention software, data leakage prevention software, and/or other security software.

In the event that the rights module 318 determines that the client network elements 110-130 have right to receive security modules 158A-C, the method 400 may proceed back to block 410. In other embodiments, at block 410, the configuration module 316 may configure the security modules 158A-C to include a full version of the antivirus software, the antimalware software, firewall software, intrusion prevention software, data leakage prevention software, and/or other security software in order to provide security services to the guest virtual machines 156A-C. In another exemplary embodiment, the configuration module 316 may configure the security modules 158A-C to include a partial version of the antivirus software, the antimalware software, firewall software, intrusion prevention software, data leakage prevention software, and/or other security software to operate in conjunction with the obsolete security application pre-installed on the client network elements 110-130.

At block 414, the rights module 318 determines that the client network elements 110-130 do not have rights to receive security modules 158A-C, the security virtual machine 310 may provide an error message to the client network elements 110-130. For example, the configuration module 316 may display an error message to the client network elements 110-130 to inform the user that the guest virtual machines 156A-C cannot be hosted by the client network elements 110-130.

At block 416, the security modules 158A-C may be provided to the guest virtual machines 156A-C in order to provide security services to the guest virtual machines 156A-C to be hosted by the client network elements 110-130. For example, the security modules 158A-C may be integrated as a portion of the guest virtual machines 156A-C and transfer the hosting of the guest virtual machines 156A-C from the server network element 140A to the client network elements 110-130. The security modules 158A-C may be activated to provide security service when the hosting of the guest virtual machines 156A-C is transferred from the server network element 140A to the client network elements 110-130.

At block 418, the method 400 may end.

Figure 5:
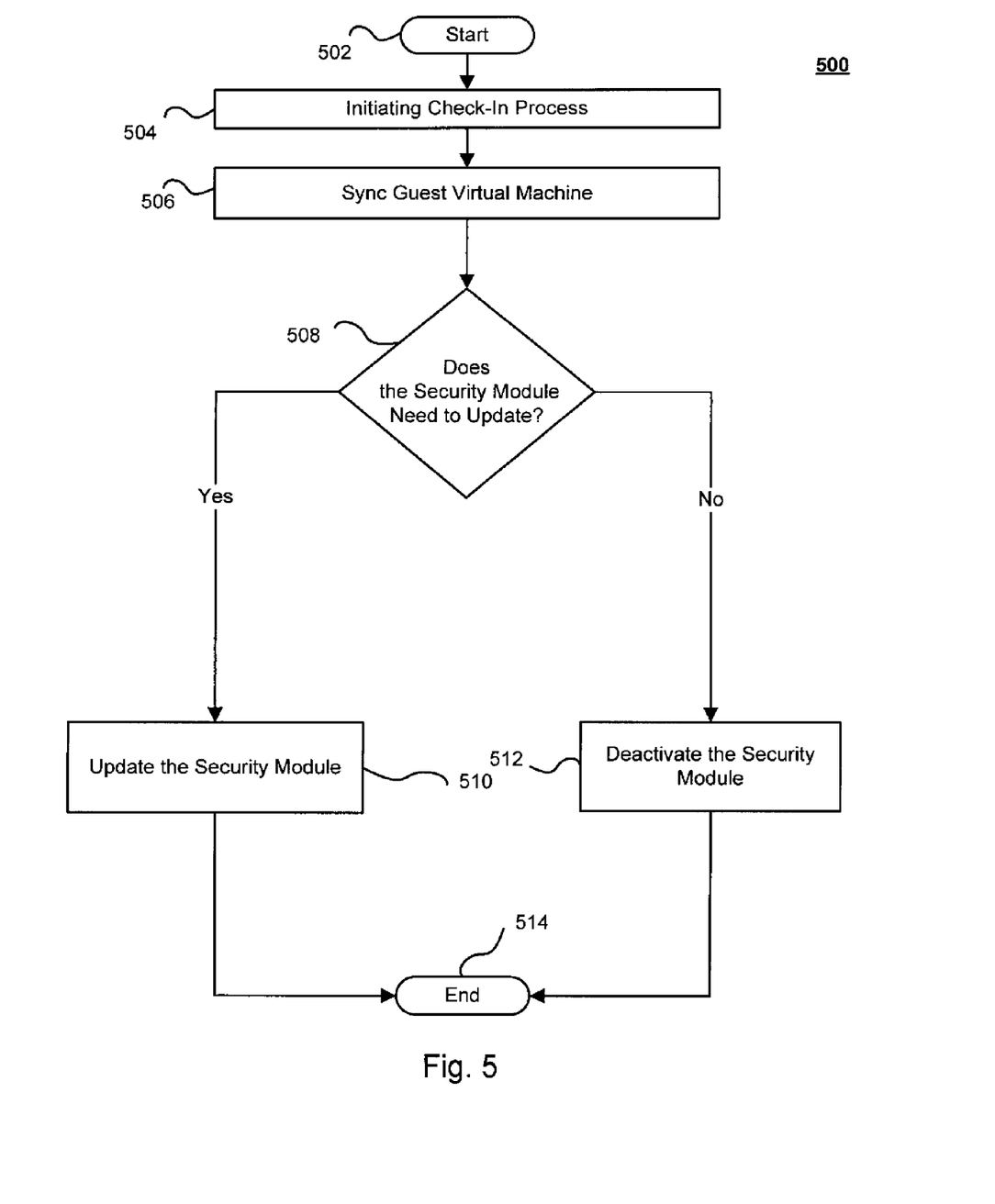
FIG. 5 depicts a method for providing security to virtual machines in a virtual desktop infrastructure (VDI) in accordance with an embodiment of the present disclosure.

Referring to FIG. 5, there is depicted a method 500 for providing security to virtual machines in a virtual desktop infrastructure (VDI) in accordance with an embodiment of the present disclosure. At block 502, the method 500 may begin.

At block 504, a user associated with one or more client network elements 110-130 may initiate a check-in process. For example, one or more client network elements 110-130 may not be communicatively coupled to the server network element 140A via the network 150. A user associated with the client network elements 110-130 that may host one or more guest virtual machines 156A-C may establish a communication link with the server network element 140A. The user may decide to reestablish a communication link with the server network element 140A and transfer hosting of the guest virtual machines 156A-C from the client network elements 110-130 back to the server network element 140A. The user send a request to initiate the check-in process in order to transfer hosting of the guest virtual machines 156A-C from the client network elements 110-130 back to the server network element 140A (e.g., the guest virtual machines 156A-C to be hosted by the server network element 140A).

At block 506, the security virtual machine 310 may sync the guest virtual machines 156A-C hosted by the client network elements 110-130 with the guest virtual machines 156A-C hosted by the server network element 140A. In an exemplary embodiment, the security virtual machine 310 may determine a different between the guest virtual machines 156A-C hosted by the client network elements 110-130 and the guest virtual machines 156A-C hosted by the server network element 140A. The security virtual machine 310 may update the guest virtual machines 156A-C hosted by the server network element 140A with the difference between the guest virtual machines 156A-C hosted by the client network elements 110-130 and the guest virtual machines 156A-C hosted by the server network element 140A.

At block 508, it may be determined whether the security modules 158A-C of the guest virtual machines 156A-C hosted by the client network elements 110-130 need to be updated. For example, the interface module 314 may interact with the security modules 158A-C of the guest virtual machines 156A-C hosted by the client network elements 110-130. The interface module 314 may gather information associated with the security modules 158A-C of the guest virtual machines 156A-C hosted by the client network elements 110-130. The interface module 314 may provide the information associated with the security modules 158A-C of the guest virtual machines 156A-C hosted by the client network elements 110-130 to the update module 320. The update module 320 may determine whether to update the security modules 158A-C of the guest virtual machines 156A-C hosted by the client network elements 110-130.

At block 510, the update module 320 may determine to update the security modules 158A-C of the guest virtual machines 156A-C of the client network elements 110-130. The update module 320 may update the security modules 158A-C of the guest virtual machines 156A-C hosted by the client network elements 110-130. For example, the update module 320 may provide an updated antivirus software, antimalware software, firewall software, intrusion prevention software, data leakage prevention software, and/or other security software to the security modules 158A-C via the interface module 314.

At block 512, the update module 320 may determine not to update the security modules 158A-C of the guest virtual machines 156A-C hosted by the client network elements 110-130. The security virtual machine 310 may deactivate the security modules 158A-C of the guest virtual machines 156A-C hosted by the client network elements 110-130. For example, the interface module 314 may communicate one or more instructions to the security modules 158A-C. In an exemplary embodiment, the interface module 314 may communicate a deactivation instruction to the security modules 158A-C. In another exemplary embodiment, the interface module 314 may communicate an uninstall instruction to the security modules 158A-C.

At block 514, the method 500 may end.

At this point it should be noted that virtual environment-based web client management in accordance with the present disclosure as described above typically involves the processing of input data and the generation of output data to some extent. This input data processing and output data generation may be implemented in hardware or software. For example, specific electronic components may be employed in security virtual machine or similar or related circuitry for implementing the functions associated with securing a checked-out virtual machine in a virtual desktop infrastructure in accordance with the present disclosure as described above. Alternatively, one or more processors operating in accordance with instructions may implement the functions associated with securing a checked-out virtual machine in a virtual desktop infrastructure in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for securing a checked-out guest virtual machine comprising:
    hosting a security virtual machine on a server network element, wherein the security virtual machine provides security services to a guest virtual machine hosted by the server network element;
    receiving a request for checking-out the guest virtual machine hosted by the server network element, wherein checking-out the guest virtual machine comprises transferring hosting of the guest virtual machine from the server network element to a client network element;
    configuring a security module for the guest virtual machine in order to secure the guest virtual machine, wherein the security module is optimized by the security virtual machine for use on the guest virtual machine hosted by the client network element; and
    providing the security module to the guest virtual machine when the guest virtual machine is checked-out.

2. The method of claim 1, further comprising transmitting a probe packet to the client network element to gather information associated with the client network element.

3. The method of claim 2, further comprising determining rights associated with the client network element based at least in part on the information associated with the client network element.

4. The method of claim 3, further comprising displaying a check-out error message based at least in part on the determination that the client network element does not have rights.

5. The method of claim 2, wherein the security module for the guest virtual machine is configured based at least in part on the information associated with the client network element.

6. The method of claim 2, wherein the information associated with the client network element comprises at least one of virtualization platform, hypervisor, security information, vulnerability, rights, storage, CPU utilization, memory, and network Input/Output (I/O).

7. The method of claim 6, wherein the security information associated with the client network element comprises at least one of security application, manufacturer, version, date, history, antivirus, antispam, antimalware, and interface.

8. The method of claim 1, further comprising determining whether a security application is associated with the client network element.

9. The method of claim 1, wherein configuring the security module for the guest virtual machine comprises configuring an interface for the security module to interact with the client network element.

10. The method of claim 9, wherein the interface for the security module is configured to interact with a security application associated with the client network element.

11. The method of claim 1, wherein configuring the security module for the guest virtual machine comprises configuring an interface for the security module to interact with the server network element.

12. The method of claim 1, wherein configuring the security module for the guest virtual machine comprises configuring a full version of at least one of antivirus software, antimalware software, firewall software, intrusion prevention software, and data leakage prevention software for the security module.

13. The method of claim 1, wherein configuring the security module for the guest virtual machine comprises configuring a partial version of at least one of antivirus software, antimalware software, firewall software, intrusion prevention software, and data leakage prevention software for the security module.

14. The method of claim 1, wherein configuring the security module for the guest virtual machine comprises configuring an updated version of at least one of antivirus software, antimalware software, firewall software, intrusion prevention software, and data leakage prevention software for the security module.

15. At least one non-transitory processor readable storage medium storing a computer program of instructions, which, when executed by at least one processor, perform the method as recited in claim 1.

16. A system for securing a checked-out guest virtual machine comprising:
one or more processors communicatively coupled to a network; wherein the one or more processors are configured to:
host a security virtual machine on a server network element, wherein the security virtual machine provides security services to a guest virtual machine hosted by the server network element;
receive a request for checking-out the guest virtual machine hosted by the server network element, wherein checking-out the guest virtual machine comprises transferring hosting of the guest virtual machine from the server network element to a client network element;
configure a security module for the guest virtual machine in order to secure the guest virtual machine, wherein the security module is optimized by the security virtual machine for use on the guest virtual machine hosted by the client network element; and
provide the security module to the guest virtual machine when the guest virtual machine is checked-out.

17. The system of claim 16, wherein the one or more processors are further configured to: transmit a probe packet to the client network element to gather information associated with the client network element.

18. The system of claim 17, wherein the security module is configured based at least in part on the information associated with the client network element.

19. The system of claim 16, wherein the one or more processors are further configured to: determine whether a security application is associated with the client network element.

20. The system of claim 17, wherein the one or more processors are further configured to: determine rights associated with the client network element based at least in part on the information associated with the client network element.

\* \* \* \* \*